United States Patent
Osawa et al.

(10) Patent No.: US 8,496,534 B2
(45) Date of Patent: Jul. 30, 2013

(54) GROUP OF TAPS WITH PREPARED HOLE CUTTING TOOLS

(75) Inventors: Jiro Osawa, Toyokawa (JP); Takehiro Yamamoto, Toyokawa (JP); Takayuki Nakajima, Toyokawa (JP)

(73) Assignee: OSG Corporation, Toyokawa (JP)

( * ) Notice: Subject to any disclaimer, the term of this patent is extended or adjusted under 35 U.S.C. 154(b) by 907 days.

(21) Appl. No.: 12/449,392

(22) PCT Filed: Feb. 21, 2007

(86) PCT No.: PCT/JP2007/053220
§ 371 (c)(1),
(2), (4) Date: Aug. 6, 2009

(87) PCT Pub. No.: WO2008/102445
PCT Pub. Date: Aug. 28, 2008

(65) Prior Publication Data
US 2010/0009766 A1     Jan. 14, 2010

(51) Int. Cl.
*B23B 51/08*   (2006.01)
*B23B 51/00*   (2006.01)

(52) U.S. Cl.
USPC .............................. 470/198; 408/30; 408/222

(58) Field of Classification Search
USPC ................... 470/198, 199, 183; 408/26, 222, 408/215, 216, 225, 30, 117, 118; 76/117
See application file for complete search history.

(56) References Cited

U.S. PATENT DOCUMENTS

| | | | | |
|---|---|---|---|---|
| 1,681,326 A | * | 8/1928 | De Leeuw | 408/52 |
| 2,703,419 A | * | 3/1955 | Barth | 470/204 |
| 4,271,554 A | * | 6/1981 | Grenell | 470/199 |
| 5,271,697 A | * | 12/1993 | Johnson et al. | 470/198 |
| 2004/0179912 A1 | * | 9/2004 | Quanz | 408/222 |

FOREIGN PATENT DOCUMENTS

| | | |
|---|---|---|
| JP | Y2-57-50177 | 11/1982 |
| JP | U-1-148229 | 10/1989 |
| JP | U-3-100022 | 10/1991 |
| JP | A-10-86019 | 4/1998 |
| JP | A-10-100020 | 4/1998 |

* cited by examiner

*Primary Examiner* — Teresa M Ekiert
(74) *Attorney, Agent, or Firm* — Oliff & Berridge, PLC

(57) ABSTRACT

In FIG. 2, a diameter Dd of drilling edges of a drill is selected smaller than a valley diameter $d_1$ of a male thread of a tap portion, and an inner diameter $D_1$ of a female thread is defined by the valley diameter $d_1$ of the male thread. Therefore, a predetermined radial gap is formed between the male thread 30 formed by the tap portion and the drill. When a tap with the drill is reversely rotated to be pulled out from the female thread after cutting the female thread, the tap released from the restriction may deflectively displace in the diameter direction upon pulling out the male thread of the tap portion from the female thread. However, the drill hardly contacts with the female thread, so that the occurrence of the defective product due to the contact is suppressed.

5 Claims, 6 Drawing Sheets

TEST SPECIFICATION

| TAP SIZE | M8X1.25 |
|---|---|
| FEMALE THREAD PRECISION | ISO2 |
| MATERIAL TO BE CUT | ADC12 |
| CUTTING LENGTH | 16 mm (THROUGH-HOLE) |
| SHAPE OF PREPARATION HOLE BEFORE CUTTING | SOLID HOLE (NO PREPARATION HOLE) |
| CUTTING MACHINE | VERTICAL MACHINING CENTER |
| CUTTING SPEED | 25, 50, 75 (m/min) |
| FEEDING | 1.25mm/rev (SYNCHRONOUS FEEDING) AFTER PREPARATION HOLE IS FORMED |
| HOLDING APPARATUS | RIGID-TYPE HOLDER |

FIG.4B

TEST PIECE DIMENSION

| TEST PIECE | DRILL DIAMETER (Dd) | TAP OUTER DIAMETER (d) | TAP EFFECTIVE DIAMETER (d2) | TAP VALLEY DIAMETER (d1) |
|---|---|---|---|---|
| CONVENTIONAL PRODUCT | 6.845 | 8.112 | 7.254 | 6.497 |
| INVENTED PRODUCT | 6.594 | 8.115 | 7.258 | 6.767 |

M8X1.25 FEMALE THREAD FIT LENGTH IS ORDINARY
( TOLERANCE ZONE CLASS 6H): 6.647～6.912mm

FIG.4C

TEST RESULT

| TEST PIECE | CUTTING SPEED (m/min) | ROTATION NUMBER (min$^{-1}$) | CUT NUMBER (HOLE) | ENDURANCE CAUSE |
|---|---|---|---|---|
| CONVENTIONAL PRODUCT | 25 | 995 | 0 | GPOUT |
| INVENTED PRODUCT | 25 | 995 | MORE THAN 200 HOLES | CONTINUOUSLY USABLE |
|  | 50 | 1990 | MORE THAN 200 HOLES | CONTINUOUSLY USABLE |
|  | 75 | 2985 | MORE THAN 200 HOLES | CONTINUOUSLY USABLE |

GPOUT=PASSAGE SIDE GAUGE IS UNABLE TO PASS (PASSAGE SIDE GAUGE OUT)

GROUP OF TAPS WITH PREPARED HOLE CUTTING TOOLS

TECHNICAL FIELD

The present invention relates to a tap with a prepared hole cutting tool, and more particularly it relates to a technique in which when a tap portion is pulled out from a female thread by reversely rotating the tap after cutting the female thread, a prepared hole cutting tool is prevented from contacting with the female thread, so as not to deform ridges of the female thread.

BACKGROUND ART

There is known a tap with a prepared hole cutting tool in which a prepared hole cutting tool having drilling edges for cutting or drilling a prepared hole, and a tap portion are formed coaxially and integrally. The tap portion is provided with a male thread corresponding to a female thread to be formed, and thread cutting edges formed along chip discharging flutes provided to divide the male thread. The thread cutting edges cut a female thread on the prepared hole formed by the prepared hole cutting tool. Patent Document 1 discloses such a tap with a drill, and Patent Document 2 discloses such a tap with an end-mill.

The tap with the drill is suitably employed when a female thread is cut on a solid or pure workpiece to be cut having no prepared hole. The tap with the end-mill is suitably employed when the female thread is cut on a workpiece to be cut provided in advance with a rough hole such as a cast hole and the like which is smaller than an inner diameter of the female thread to be formed.

Figure 6A:
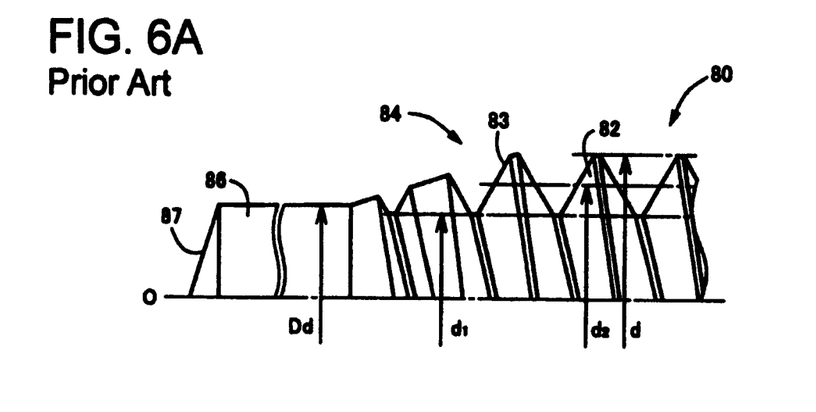
FIG. 6 is a view for explaining one example of the conventional tap with a drill.
Figure 6B:
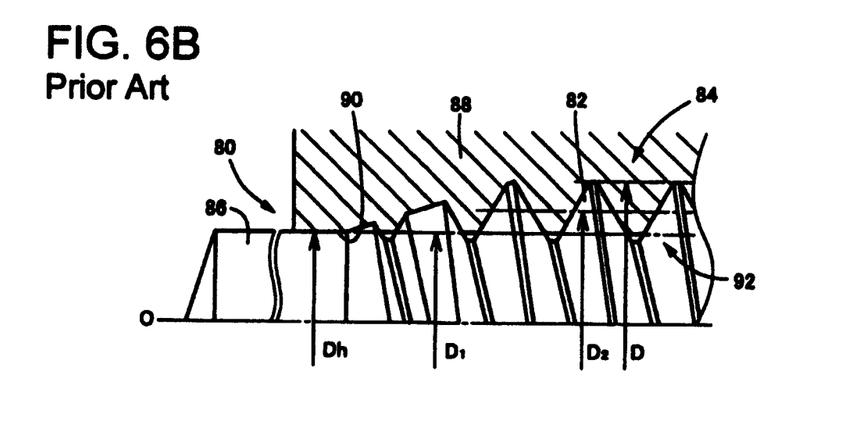

A tap with a drill 80 shown in FIG. 6B will be specifically described. This tap 80 comprises a tap portion 84 provided with one streak male thread 82 and a drill 86 as a prepared hole drilling tool, which are formed coaxially and integrally. The drill 86 and tap portion 84 are continuously formed with unillustrated chip discharging grooves (helical flutes) at a constant lead, and drilling edges 87 are provided at a portion where the chip discharging flutes open at the tip end of the drill 86. The tap portion 84 is provided with thread cutting edges 83 along the chip discharging flutes.

As shown in FIG. 6B, after cutting a prepared hole 90 on a workpiece 88 to be cut by a proceeding drill 86, the tap portion 84 cuts a female thread 92 on a prepared hole 90. In this case, since a diameter dimension (drill diameter) Dd of the drilling edges 87 of the drill 86 is selected larger than a valley diameter $d_1$ of a male thread 82 of the tap portion 84, a diameter dimension Dh (≈Dd) of the prepared hole 90 formed by the drill 86 directly corresponds to an inner diameter $D_1$ of the female thread 92. Further, a valley diameter D and an effective diameter D2 of the female thread 92 correspond to an outer diameter d and an effective diameter d2 of the male thread 82 of the tap portion 84, respectively. FIG. 6 is a set of schematic views showing an upper half of a central line O of the tap with the drill 80. It is an explanatory view for mainly explaining the diameter dimensions of respective portions of the cutting edges, with the chip discharging flutes omitted. FIG. 6A represent rotation locus profiles of the drilling edges 87 and the thread cutting edges 83 formed at the opened portion of one chip discharging flute.

Here, when the female thread 92 is cut on a through-hole, a length of the drill 86 is generally selected longer than that of the female thread 92. First, the tap with the drill 80 is rotationally driven at high rotation speed suitable for drilling the penetrated prepared hole 90 by the drill 86. Then, feeding of the tap with the drill 80 is switched over to a synchronous feeding in which the tap portion 84 screws into the prepared hole in accordance with the lead of the male thread 82 of the tap portion 84, so that the thread cutting edges 83 of the tap portion 84 cut the female thread 92. FIG. 6B shows a halfway state in which the tap portion 84 cuts the female thread 92 on the prepared hole 90.

Figure 6C:
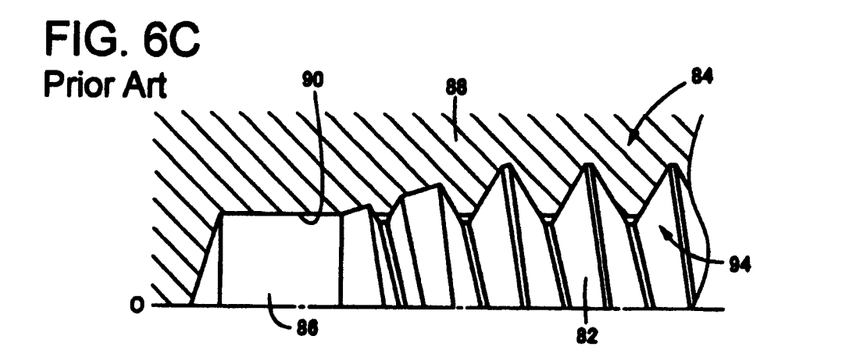

On the other hand, when a female thread 94 is cut on a blind hole i.e., axially closed hole as shown in FIG. 6C by the short drill 86, the tap is fed in the synchronous feeding from the beginning so that the tap portion 84 screws into the prepared hole in accordance with the lead of the male thread 82 of the tap portion 84. With cutting the prepared hole 90 by the drill 86, the thread cutting edges 83 of the tap portion 84 cut the female thread 94.

[Patent Document 1] Japanese Patent Laid-Open No. 10-100020

[Patent Document 2] Japanese Patent Laid-Open No. 10-86019

DISCLOSURE OF THE INVENTION

Problems To Be Solved By The Invention

When the tap with the prepared hole cutting tool is used to cut the female thread on the prepared hole, the tap with the prepared hole cutting tool needs to be pulled out from the female thread after cutting the female thread, by reversely rotating the tap. However, when the male thread of the tap portion is pulled out from the female thread, the prepared hole cutting tool often contacts with a vicinity of an opening of the female thread, to resultantly damage a ridge shape thereof or to generate a burr thereon, thereby making the female thread i.e., the workpiece defective (gauge out). That is, if a misalignment occurs when the prepared hole cutting tool bites in a workpiece to be cut to form the prepared hole, the original central line of the tap and the prepared hole, i.e., the female thread formed on the prepared hole are misaligned. In this case, when the male thread of the tap portion is pulled out from the female thread, the tap released from the restriction deflectively displaces in the diameter direction, so that the prepared hole cutting tool on the top end may be brought into contact with the ridge of the female thread.

For example, when the female thread is cut on a flexible material such as aluminum casting, slight contact of the prepared hole cutting tool with the female thread may crash and deform the ridge of the female thread, which makes Al casting product defective. Further, when the female thread 94 is cut on the blind hole as in FIG. 6C, when the tap with prepared hole cutting tool is fed in the synchronous feeding from the beginning, the prepared hole cutting tool bites in the workpiece to be cut at a low rotation speed. Therefore, the resistance upon biting tends to cause the misalignment, thereby making the above problem remarkable.

The present invention has been made with the above described circumstances as a background, and has an object to prevent the occurrence of the defective product due to the contact of the prepared hole cutting tool with the female thread when the tap is reversely rotated to be pulled out after cutting the female thread.

Means For Solving The Subject

For achieving the above object, a first aspect of the present invention relates to a group of taps with prepared hole cutting tools, each of the taps including a prepared hole cutting tool having drilling edges for cutting a prepared hole; a tap portion provided with a male thread corresponding to a female thread to be formed and thread cutting edges formed by chip discharging flutes provided to divide the male thread, for cutting the female thread by the thread cutting edges on the prepared hole formed by the prepared hole cutting tool, the prepared hole and the tap portion being coaxially and integrally formed.

Each of the taps with the prepared hole cutting tools has a diameter, i.e., outer diameter Dd of the drilling edges of the prepared hole cutting tool is selected smaller than a valley diameter $d_1$ of the male thread of the tap portion, and an inner diameter $D_1$ of the female thread is determined depending on the valley diameter $d_1$ of the male thread.

The group of the taps with the prepared hole cutting tools are characterized in that a dimension difference of the diameter Dd of the drilling edges of the prepared hole cutting tool relative to the valley diameter $d_1$ of the male thread of the tap portion is selected large, as a protruding dimension from the tap portion to a top end of the prepared hole cutting tool is large.

A second aspect is featured by that, in the group of the taps with the prepared hole cutting tools of the first aspect, the valley diameter $d_1$ of the male thread of the tap portion is selected within a range of an allowable dimension from $D_{1min}$ to $D_{1max}$ selected in advance for the an inner diameter of the female thread to be formed.

A third aspect is featured by that, in the group of the taps with the prepared hole cutting tools of the second aspect, the diameter i.e., outer diameter Dd of the drilling edges of the prepared hole cutting tool is selected smaller than a lower limit value $D_{1min}$ of the allowable dimension from $D_{1min}$ to $D_{1max}$.

A fourth aspect is featured by that, in the group of the taps with the prepared hole cutting tools of one of the first to fourth aspects, the prepared hole cutting tool is a drill.

A fifth aspect is featured by that, in the group of the taps with the prepared hole cutting tools of one of the first to fourth aspects, the prepared hole cutting tool is an end-mill.

A sixth aspect is featured by that, in the group of the taps with the prepared hole cutting tools of one of the first to fifth aspects, the taps with the prepared hole cutting tools are used in a female thread cutting method in which after cutting a penetrated prepared hole by the prepared hole cutting tool, a feeding of the tap is switched over to a synchronous feeding in which the tap portion screws into the prepared hole in accordance with a lead of the male thread of the tap portion so that the tap portion cuts the female thread on the prepared hole.

A seventh aspect is featured by that, in the group of the taps with the prepared hole cutting tools of one of the first to fifth aspects, the taps with the prepared hole cutting tools are used, in a female thread cutting method in which in a synchronous feeding to feed the tap in accordance with a lead of the male thread of the tap portion, with screwing the tap portion into the prepared hole, the tap portion cuts the female thread on the prepared hole.

In the tap with prepared hole cutting tool, the diameter Dd of the drilling edges of the prepared hole cutting tool is selected smaller than the valley diameter $d_1$ of the male thread of the tap portion, and the inner diameter $D_1$ of the female thread is determined depending on the valley diameter $d_1$ of the male thread. Therefore, a predetermined gap is formed between the female thread formed by the tap portion and the prepared hole cutting tool. As a result, when the tap is reversely rotated and pulled out from the female thread after cutting the female thread, if the male thread of the tap portion pulled out from the female thread may defectively or shakingly displace due to release from the restriction, it hardly contacts with the female thread. Thus, the occurrence of the defective product i.e., workpiece due to such contact is suppressed.

In the second aspect, the dimension difference of the diameter Dd of the drilling edges of the prepared hole cutting tool relative to the valley diameter $d_1$ of the male thread of the tap portion is selected large, as the protruding dimension from the tap portion to a top end of the prepared hole cutting tool is large. Therefore, even if the diametral displacement amount of the top end portion of the prepared hole cutting tool becomes large because of a large protruding dimension, the contact between the prepared hole cutting tool and the female thread can be suitably suppressed. In addition, for the small protruding dimension, the dimension difference between the diameter Dd of the drilling edges and the valley diameter $d_1$ of the male thread of the tap portion becomes small, so that the cutting amount by the tap portion becomes small. Thus, the cutting resistance is reduced to improve the durability of the tap portion.

In the third aspect, the valley diameter $d_1$ of the male thread of the tap portion is selected within the range of allowable dimension from $D_{1min}$ to $D_{1max}$ set or selected in advance depending on a required precision for the inner diameter of the female thread to be formed. Consequently, the inner diameter of the female thread can be cut with desired dimension precision.

In the fourth aspect, the diameter Dd of the drilling edges of the prepared hole cutting tool is selected smaller than the lower limit value $D_{1min}$ of the allowable dimensions from $D_{1min}$ to $D_{1max}$. Consequently, with appropriately setting or selecting the valley diameter $d_1$ of the male thread within a range of allowable dimension from $D_{1min}$ to $D_{1max}$, the diameter Dd of the drilling edges of the prepared hole cutting tool is definitely set or selected smaller than the valley diameter $d_1$, so that the radial gap is formed between the diameter Dd and the inner diameter ($\approx d_1$) of the female thread formed.

In the fifth aspect, the prepared hole cutting tool is the drill. The drill is suitably employed to cut the female thread on the pure workpiece to be cut having no prepared hole.

In the sixth aspect, the prepared hole cutting tool is the end-mill. The end-mill is suitably employed to cut the female thread on the workpiece to be cut provided with a rough hole such as the cast hole and the like to be formed which is smaller than the inner diameter of the female thread.

In the seventh aspect, after cutting a penetrated prepared hole by the prepared hole cutting tool, the feeding of the tap is switched over to the synchronous feeding in which the tap portion screws into the prepared hole in accordance with the lead of the male thread of the tap portion so that the tap portion cuts the female thread on the prepared hole. Since the prepared hole can be cut at high speed rotation speed without influenced by restriction by the synchronous feeding, for example, the misalignment upon the biting when the drill cuts the prepared hole can be suppressed. As a result, when the tap is reversely rotated to be pulled out from the female thread after cutting the female thread, the deflective displacement upon pulling-out of the male thread of the tap portion from the female thread is suppressed. Thus, the occurrence of the defective product due to the contact of the prepared hole cutting tool with the female thread can be more effectively suppressed.

In the eighth aspect, in the synchronous feeding to feed the tap in accordance with a lead of the male thread of the tap portion, with screwing the tap portion into the prepared hole, the tap portion cuts the female thread on the prepared. This is suitably applied to cut the female thread on the blind hole i.e., axially closed hole. When the prepared hole is cut by the prepared hole cutting tool such as the drill by the synchronous feeding, due to the slow rotational speed, the misalignment between the prepared hole cutting tool and the prepared hole tends to occur upon biting. Therefore, when the tap is reversely rotated to be pulled out from the female thread, after cutting the female thread, the male thread of the tap portion tends to defectively displace in the diameter direction, i.e., diametrally by a large amount upon pulling-out thereof from the female thread. In view of this, the diameter Dd of the drilling edges of the prepared hole cutting tool is selected smaller than the valley diameter $d_1$ of the male thread of the tap portion, so that the effect can be more remarkably rendered, which is the contact of the prepared hole cutting tool with the female thread due to the deflective displacement is suppressed.

BRIEF DESCRIPTION OF THE DRAWINGS

FIG. 1 is a set of views showing a tap with a drill which is one embodiment of the present invention, wherein

FIG. 3 is a set of views for explaining another example of the tap with the drill of the present invention, wherein

FIG. 4 is a table showing FIG. 4A a test specification, and FIG. 4B a test piece dimension, and FIG. 4 C a test result, of a durability test conducted by using the invented tap of FIG. 1 and the conventional tap of FIG. 6;

BEST MODE FOR CARRYING OUT THE INVENTION

Explanation of References
10, 40: tap with drill (tap with prepared hole cutting tool)
12, 42: drill (prepared hole cutting tool)
13, 43, 53: drilling edges 14: tap portion 20: male thread
21: thread cutting edges 22: chip discharging flutes
30: female thread (through-hole) 34, 44: preparation hole
36: female thread (blind hole)
50: tap with end-mill (tap with prepared hole cutting tool)
52: end-mill Dd: diameter dimension of drilling edges
d1: valley diameter of tap portion D1: inner diameter of female thread The prepared hole cutting tool and the tap portion are preferably provided with chip discharging flutes continuously over the entire length thereof, and for example, drilling edges are provided at the portion in which the chip discharging flutes open at the top end of the prepared hole cutting tool. Helical flues twisted in the direction for discharging the chips toward a shank side is preferable as the chip discharging flutes, but straight flutes parallel with an axis can be also employed. Employing the helical flutes for the prepared hole cutting tool, the straight flutes for the tap portion and the like are possible. Thus, various modes can be employed. Further, the number of the chip discharging flutes in the prepared hole cutting tool and that in the tap portion are not necessarily equal. For example, the prepared hole cutting tool has two chip discharge flutes, and the tap portion has a total of four chip discharge flutes (with four thread cutting edges) including, in addition to the two flutes continued from the prepared hole cutting tool, respective one chip discharge flutes is additionally formed between these two chip discharge flutes. In this manner, various modes can be employed.

The present invention can be applied to any of the taps with the prepared hole cutting tool, for both the right-hand thread and the left-hand thread. The prepared hole cutting tool and the tap portion are preferably formed integrally by, for example, a single tool material, but the prepared hole cutting tool may be constructed separately from the tap portion, and then integrally coupled to the tap portion by welding, shrink fitting, and the like.

In the second aspect of the invention, as the protruding dimension from the tap portion to the top end of the prepared hole cutting tool becomes large, the dimension difference of the diameter Dd of the drilling edges of the prepared hole cutting tool relative to the valley diameter $d_1$ of the male thread of the tap portion is selected large, so that the diameter Dd is selected small. However, when performing another aspect of the invention, the dimension difference between the diameter Dd and the valley diameter $d_1$ may be selected constant, irrespective difference of the protruding dimension.

In the third aspect of the invention, the valley diameter $d_1$ of the male thread of the tap portion is selected within the range of the allowable dimension from $D_{1min}$ to $D_{1max}$ selected previously for the inner diameter of the female thread to be formed. This allowable dimension from $D_{1min}$ to $D_{1max}$, for example, is appropriately defined by the standards (classification and the like) of JIS, ISO, and the like depending on the required precision of the female thread. The lower limit value (minimum allowable dimension) $D_{1min}$ is generally an inner diameter dimension (inner diameter reference dimension) of a reference ridge shape of the female thread and is constant, while the maximum allowable dimension $D_{1max}$ is changed depending on the required precision. The valley diameter $d_1$ of the male thread of the tap portion may be preferably selected at least within the range of the allowable dimension from $D_{1min}$ to $D_{1max}$, but considering the cutting errors such as deflection and the like, it can be selected within a range equal to or less than half its tolerance. Specifically, the valley diameter $d_1$ is preferably selected within a range equal to or more than a minimum allowable dimension $D_{1min}$, and equal to or less than the value $[(D_{1min}+D_{1max}-D_{1min})/2]$, which is obtained by adding half the tolerance $[(D_{1max}-D_{1min})/2]$ to the minimum allowable dimension $D_{1min}$.

In the eighth aspect of the invention, in the synchronous feeding to feed the tap in accordance with the lead of the male thread of the tap portion, with screwing the tap portion into the prepared hole, the tap portion cuts the female thread on the prepared. This is suitably employed when the female thread is cut on the blind hole, but it is also employed when the female thread is cut on the through-hole.

Further, in the eighth aspect of the invention, the prepared hole is cut by the synchronous feeding from the beginning. Another aspect of the invention is performed as follows. That is, for example, at first, the tap is rotationally driven at high rotational speed suitable for drilling to cut the prepared hole by the prepared hole cutting tool. Then, before the tap portion axially reaches the workpiece to be cut, feeding of the tap is switching over to the synchronous feeding, so that with cutting the prepared hole by the prepared hole cutting tool, the tap portion cuts the female thread on the prepared hole. In this manner, various cutting modes can be employed.

Embodiment

An embodiment of the present invention will be described in detail below with reference to the drawings.

Figure 1A:
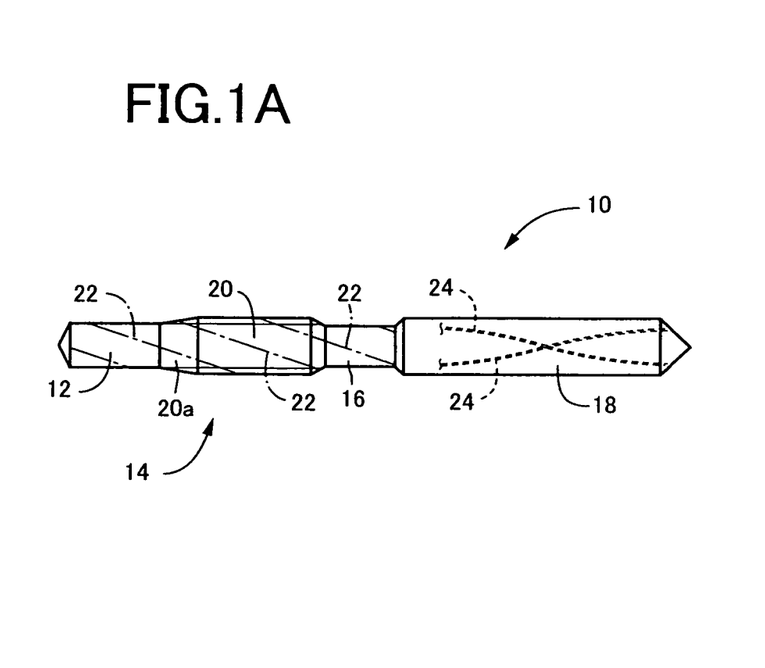
FIG. 1A is a schematic front view thereof.
Figure 1B:
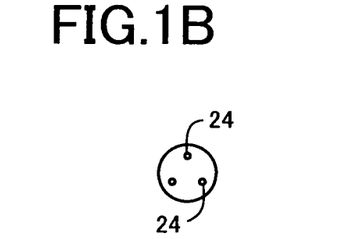
FIG. 1B is an end view seen from a shank side.

FIG. 1A is a schematic front view of a tap with a drill 10 which is one embodiment of the present invention, and FIG. 1B is an end view viewed from side of a shank 18 located on the right side of FIG. 1A. This tap with the drill 10 is a tap with a prepared hole cutting tool having a drill 12 as a prepared hole cutting tool. It comprises a drill 12, a tap portion 14, a neck portion 16, and a shank 18 all being coaxially and successively formed in this order from the axially top end and integrally constructed by cemented carbide. This tap with the drill 10 is for the right-hand thread cutting. The tap portion 14 is provided with a right-hand male thread 20 corresponding to a female thread to be formed, and provided with three chip discharging flutes 22 twisted clockwise to divide the male thread 20. Thread cutting edges 21 (see FIG. 2A) are formed along the chip discharging flutes 22.

When the tap with the drill 10 is synchronously fed in accordance with the lead of the male screw 20 to be screwed into the prepared hole with rotationally driven clockwise as viewed from side of the shank 18, the thread cutting edges 21 cut the female thread on the prepared hole, and the chips are discharged to side of the shank 18 along the chip discharging flutes 22. At side of the tool top end of the male thread 20, that is, at side of the drill 12, a biting portion 20a is provided whose ridges gradually decreases, for example, in a range of about 1.5 ridges to cut the female thread.

The three chip discharging flutes 22 are provided from the top end of the drill 12 to this side, i.e., a front of the shank 18 at the same lead, at an equiangular interval (120° interval) around the axis. The portion where these chip discharging flutes 22 open at the top end of the drill 12 is formed with drilling edges (drill blades) 13 (see FIG. 2A) which cut the prepared hole by rotationally driven clockwise as viewed from side of the shank 18. The chip discharging flutes 22 are provided at a constant lead to have a twisted angle of, for example, about 28° in the full ridge portion of the tap portion 14. Further, the tap with the drill 10 is provided with three twisted oil holes 24 along the twist of the chip discharging flutes 22 from an end face at side of the shank 18 to the top end of the drill 12. These oil holes 24, opened at a relief surface of the drilling edges 13, can supply a lubricating oil agent, a cooling air, and the like according to need.

Figure 2A:
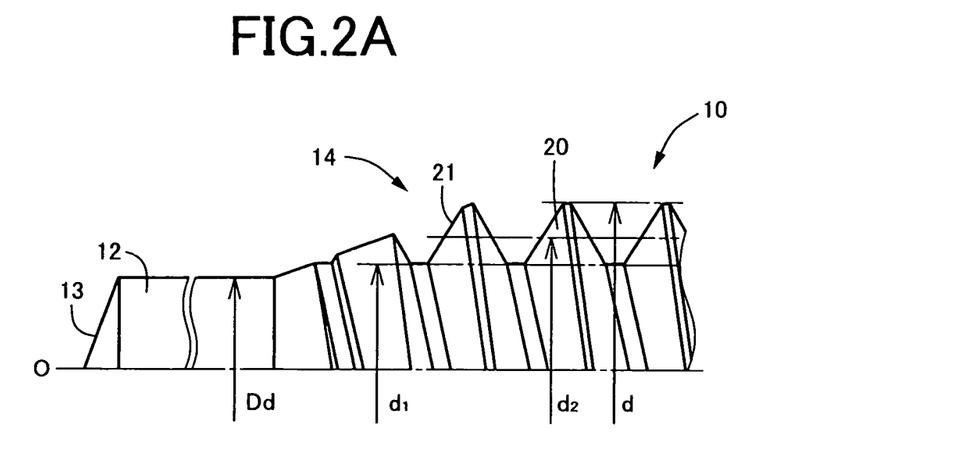
FIG. 2A is a view for explaining a diameter dimension of each portion of the tap with the drill of FIG. 1.

FIG. 2A is a view for specifically explaining the drill 12 and the tap portion 14 of the tap with the drill 10, and is a schematic view showing the upper half of a central line O. This mainly explains the diameter dimensions, i.e., diameters of respective portions of the cutting edges, with the chip discharging flutes 22 omitted. Further, the drilling edges 13 and the thread cutting edges 21 in FIG. 2A represent rotation locus shapes thereof formed at the opening portion of one chip discharging flutes 22.

In FIG. 2A, a valley diameter $d_1$ of the male thread 20 of the tap portion 14 is determined or defined in a range of allowable dimension from $D_{1min}$ to $D_{1max}$ previously selected for the inner or internal diameter $D_1$ of a female thread 30 (see FIG. 2B) to be formed. The allowable dimension from $D_{1min}$ to $D_{1max}$ is appropriately defined by the standards (classification and the like) of JIS, ISO and the like, depending on the required precision of the female thread 30. A valley diameter $d_1$ of the tap portion 14 may be selected at least within a range of the allowable dimension from $D_{1min}$ to $D_{1max}$. In the present embodiment, considering the cutting errors such as deflection and the like, the valley diameter $d_1$ is selected within a range equal to or less than half its tolerance ($D_{1max}-D_{1min}$), that is, within a range equal to or more than the minimum allowable dimension $D_{1min}$, and a range equal to or less than the value $[D_{1min}+(D_{1max}-D_{1min})/2]$ obtained by adding half the tolerance $[(D_{1max}-D_{1min})/2]$ to the minimum allowable dimension $D_{1min}$.

For example, for the tap of M8×1.25 where a fit length is ordinary (tolerance zone class 6H), the minimum allowable dimension $D_{1min}$ is selected equal to 6.647 mm (=6.647 mm), and the maximum allowable dimension $D_{1max}$ is selected equal to 6.912 mm (=6.912 mm). Consequently, the tolerance ($D_{1max}-D_{1min}$) is equal 0.265 mm, and half thereof is about 0.133 mm. Therefore, the minimum allowable dimension $D_{1min}$ is selected equal to or more than 6.647 mm, and the valley diameter $d_1$ is selected within a range equal to or less than $[D_{1min}+(D_{1max}-D_{1min})/2]$ 6.647+0.133=6.78 mm. An outer diameter i.e., external diameter d and an effective diameter d2 of the male thread 20 are appropriately selected within a range of the allowable dimension selected by the standards (classification and the like) of JIS, ISO and the like, depending on the required precision of the female thread 30.

Further, the diameter dimension (drill dimension) Dd of the drilling edges 13 of the drill 12 is selected smaller than the valley diameter $d_1$ of the male thread 20, and in the present embodiment, it is smaller than the lower limit value (minimum allowable dimension) $D_{1min}$ of the allowable dimension from $D_{1min}$ to $D_{1max}$. This lower limit value $D_{1min}$, which is an inner diameter dimension (inner diameter reference dimension) of a reference ridge shape of the female thread, is selected constant regardless of the precision of a classification and the like. For the thread of M8×1.25, $D_{1min}$ is 6.647 mm, and the drill diameter or outer diameter Dd is, for example, about 6.6 mm. Further, in the present embodiment, the larger the length dimension of the drill 12, that is, the protruding dimension from the tap portion 14 to the top end of the drill 12 is, the larger the difference of the diameter Dd relative to the valley diameter $d_1$ is, so that the drill diameter Dd is selected smaller.

Figure 2B:
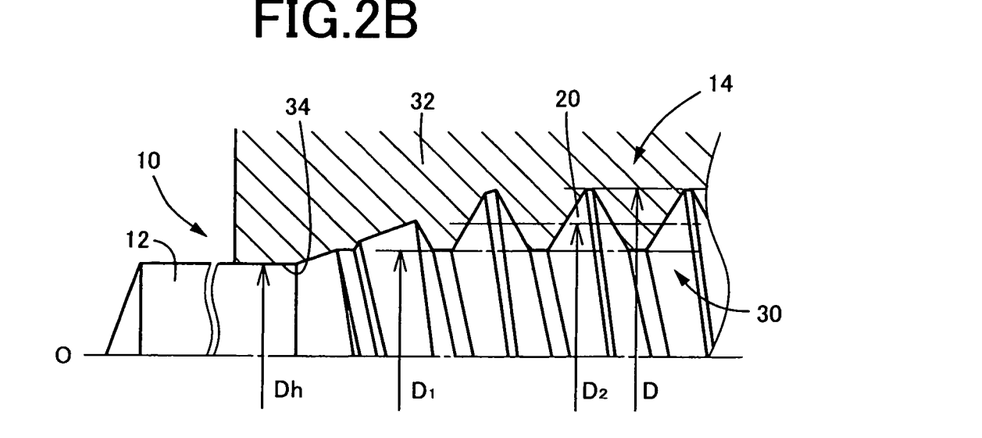
FIG. 2B is a view for explaining diameter dimensions of respective portions formed on a thread hole formed on a through-hole formed by the tap with the drill of FIG. 1, and shows a halfway state in which the tap portion cuts a female thread on a prepared hole.

Such tap with the drill 10 is, for example, mounted on the main shaft of a numerically controlled machine tool, through a rigid type holder as shown in FIG. 2B, to cut a prepared hole 34 on a workpiece to be cut 32 by a preceding drill 12, and then to cut the female thread 30 on the prepared hole 34 by the tap portion 14. Here, since the diameter (drill diameter) Dd of the drilling edges 13 of the drill 12 is selected smaller than the valley diameter $d_1$ of the male thread 20 of the tap portion 14, a diameter Dh (≈Dd) of the prepared hole 34 formed by the drill 12 becomes smaller than an inner diameter $D_1$ of the female thread 30. Therefore, a valley portion of the male thread 20 of the tap portion 14 further bites in the inner peripheral surface of the prepared hole 34 to cut the same. In this way, the valley diameter $d_1$ of the male thread 20 determines the inner diameter $D_1$ of the female thread 30. A valley diameter D and an effective diameter $D_2$ of the female thread 30 correspond to the outer diameter d and the effective diameter $d_2$ of the male thread 20 of the tap portion 14, respectively.

As apparent from FIG. 2B, in the present embodiment, for cutting the female thread 30 on the through-hole of the workpiece to be cut 32, an axial length of the drill 12 is selected longer than an axial length of the female thread 30. First, the tap with the drill 10 is rotationally driven at high rotation speed suitable for cutting the penetrated prepared hole 34 by the drill 12. Then, feeding of the tap with the drill 10 is switched over to synchronous feeding so that the male thread portion 20 of the tap portion 14 screws into the preparation hole in accordance with the lead of the male thread 20, so that the thread cutting edges 21 of the tap portion 14 cut the female thread 30. Further, after completing the cutting of the female thread 30, the tap with the drill 10 is reversely rotated in accordance with the lead of the male thread 20 of the tap portion 14 to be pulled out from the female thread 30. After being completely pulled out from the female thread 30, the tap portion 14 may be axially pulled out, for example, by high speed feeding. FIG. 2B shows a halfway state in which the tap portion 14 is cutting the female thread 30 on the prepared hole 34.

Figure 3A:
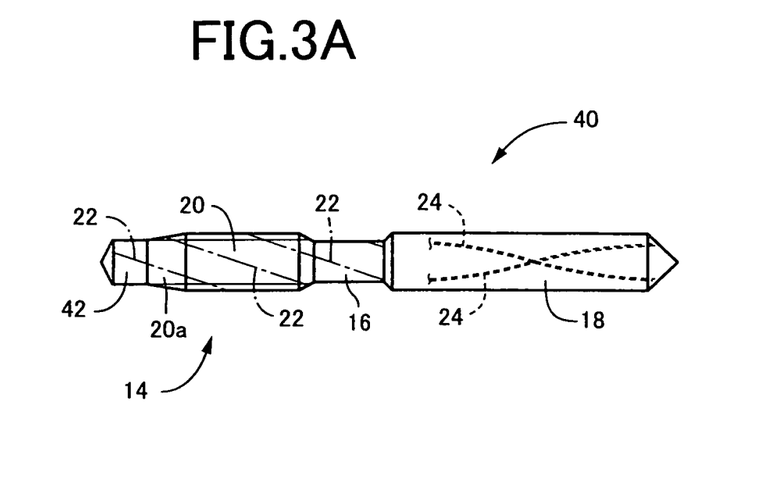
FIG. 3A is a schematic front view equivalent to FIG. 1A.
Figure 3B:
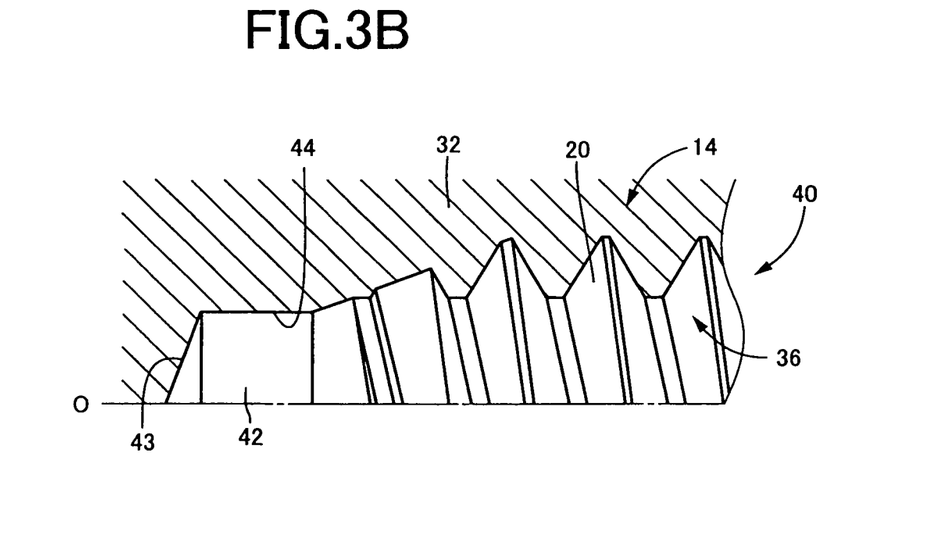
FIG. 3B is a view showing a thread hole formed on a blind hole cut together with the tap with the drill of FIG. 3A.

Next, the cutting of a female thread 36 on a blind hole will be explained as shown in FIG. 3B. In this case, as shown in FIG. 3A, a tap with a drill 40 having a drill 42 whose axial length dimension is shorter than that of the tap with the drill 10 is suitably employed. From the beginning, the tap with the drill 40 is fed in the synchronous feeding in which the tap portion 40 screws into the prepared hole 44, so that with cutting the prepared hole 44 by the drilling edges 43 of the drill 42, the female thread 36 is cut by the thread cutting edges 21 of the tap portion 14. Further, after completing the cutting of the female thread 36, the tap with the drill 40 is reversely rotated to be pulled out from the female thread 36 in accordance with the lead of the male thread 20 of the tap portion 14. After being completely pulled-out from the female thread 36, the tap portion 14, i.e., the tap with the drill 40 for example is pulled out axially by high speed feeding. As the length dimension of the drill 42 becomes short, the diameter Dd of the drilling edges 43 of the drill 42 is selected small relative to the valley diameter $d_1$ to have the small diameter difference, and is larger than the diameter Dd of the drill 12 in the range smaller than the minimum allowable dimension $D_{1min}$.

In such tap with the drill 10 or 40, the diameter dimensions Dd of the drilling edges 13 and 43 of the drills 12 and 42 are smaller than the valley diameter $d_1$ of the male thread 20 of the tap portion 14 which determines the inner diameters $D_1$ of the female threads 30 and 36. Therefore, predetermined axial gaps are formed between the female threads 30 and 36 formed by the tap portion 14 and the drills 12 and 42. When the tap with the drills 10 and 40 are reversely rotated to be pulled out from the female threads 30 and 36 after cutting the female threads, the tap with the drills 10 and 40 released from the restriction may defectively displace in the diameter direction upon pulling out the male thread 20 of the tap portion 14 from the females threads 30 and 36. However, the drills 12 and 42 hardly contact with the female threads 30 and 36, so that the occurrence of the defective product i.e., workpiece resulted from such contact is suppressed.

Further, as the protruding dimension from the tap portion 14 to the top ends of the drills 12 and 42 becomes larger, the dimensional difference of the diameter Dd of the drilling edges 13 and 43 of the drills 12 and 42 relative to the valley diameter $d_1$ of the tap portion 14 is selected larger. Therefore, even if the drill 12 is large in the displacement amount of the top end portion due to the large protruding dimension, likewise the tap with the drill 10, the contact between the drill 12 and the female thread 36 can be suitably suppressed. On the other hand, when the protruding dimension of the drill 42 is small as the tap with the drill 40, due to the small dimensional difference between the diameter Dd of the drilling edges 43 and the valley diameter $d_1$ of the tap portion 14, the cutting amount by the tap portion 14 becomes small. Thus, the cutting resistance of the tap portion 14 is reduced to improve the durability or endurance thereof.

Further, the valley diameter $d_1$ of the tap portion 14 defining the inner diameters $D_1$ of the female threads 30 and 36 is selected within the range of the allowable dimension from $D_{1min}$ to $D_{1max}$ selected in advance, depending on the required precision and the like for the inner diameters $D_1$ of the female threads 30 and 36 to be formed. Therefore, the inner diameters $D_1$ of the female threads 30 and 36 are cut by the desired dimension precision.

Further, the diameter Dd of the drilling edges 13 and 43 of the drills 12 and 42 are selected smaller than the lower limit value $D_{1min}$ of the allowable dimension from $D_{1min}$ to $D_{1max}$. Therefore, with appropriately selecting the valley diameter $d_1$ of the male thread 20 within the range of the allowable dimension from $D_{1min}$ to $D_{1max}$, the diameter Dd of the drilling edges 13 and 43 of the drills 12 and 42 are selected definitely smaller than the valley diameter $d_1$. Thus, the radial gap is formed between the valley diameter $d_1$ and the inner diameters $D_1$ ($\approx d_1$) of the female threads 30 and 36.

Further, in the present embodiment, since the drills 12 and 42 are provided as the prepared hole cutting tool, the tap can be suitably employed, when the female threads 30 and 36 are cut on the pure or solid workpiece to be cut 32 having no prepared hole.

Further, when the female thread 30 is cut on the through-hole by the tap with the drill 10 having the drill 12 whose length dimension is selected longer than the axial length of the female thread 30, the cutting is performed as follows. That is, after cutting the penetrated prepared hole 34 by the drill 12, feeding of the tap is switched over to the synchronous feeding in accordance with the lead of the male thread 20 of the tap portion 14, so that the tap portion 14 cuts the female thread 30. Since the prepared hole 34 can be cut by the drill 12 at high speed rotation with no restriction by the synchronous feeding, the misalignment between the prepared hole 34 and the drill 12 upon biting of the drill with the prepared hole 34 is suppressed. As a result, after cutting the female thread 30, when the tap the drill 10 is reversely rotated to be pulled out from the female thread 30, the deflective displacement of the male thread 20 of the tap portion 14 upon pulling-out thereof from the female thread 30 is suppressed. Thus, the occurrence of the defective product i.e., workpiece to be cut resulted from the contact between the drill 12 and the female thread 30 can be more effectively suppressed.

Further, in the case of the tap with the drill 40 having the drill 42 of relatively short length dimension, in the synchronous feeding in accordance with the lead of the male thread 20 of the tap portion 14, with cutting the prepared hole 44 by the drill 42, the thread cutting edges 21 of the tap portion 14 cut the female thread 36 on the prepared hole 44. Therefore, the female thread 36 of the blind hole can be suitably cut. However, when the prepared hole 44 is cut by the drill 42 by such synchronous feeding, the misalignment tends to occur upon biting due to the slow rotational speed. When the tap with the drill 40 is reversely rotated to be pulled out from the female thread 36 after cutting the female thread 36, the male thread 20 of the tap portion 14 tends to deflectively displace in the radial direction by large amount upon pulling-out of the female thread 36 from the female thread 36.

In view of this, the diameter Dd of the drill 42 is selected smaller than the valley diameter $d_1$ of the tap portion 14. Thereby, the effect can be more remarkably rendered, that is, the contact of the drill 42 with the female thread 36 resulted from the deflective displacement thereof can be suppressed. Even for the tap with the drill 10 having the drill 12 of relatively long length dimension, as long as the thickness of the workpiece to be cut 32 is sufficiently thick relative to the female threads 36 of the blind hole, performing the synchronous feeding from the beginning, likewise the above tap with the drill 40, can cut the female thread 36 on the blind hole.

Figure 4A:
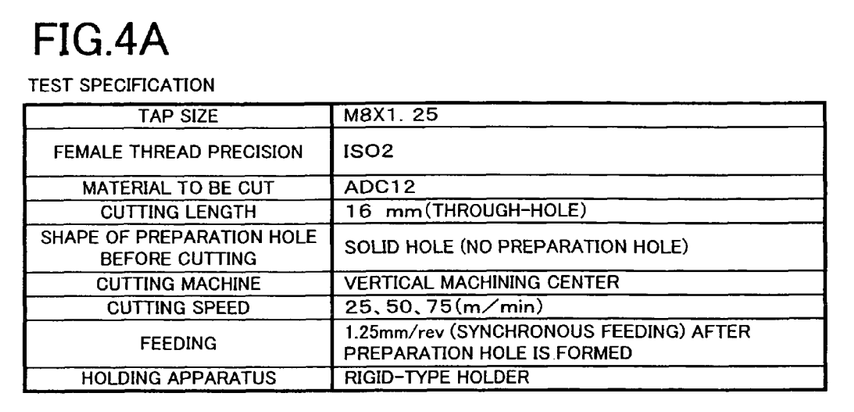

FIG. 4 is a table for explaining the result of the durability test conducted by using the tap with the drill 10 of the present invention and the conventional tap with the drill 80 shown in FIG. 6. Here, the female threads 30 and 92 having a thread length of 16 mm are cut on the through-hole, and accordingly the length of the drills 12 and 86, i.e., the test pieces are longer than 16 mm, respectively. After cutting the penetrated prepared holes 34 and 90 by the drills 12 and 86 rotationally driven at the rotational speed suitable for drilling, the female threads 30 and 92 are cut by the tap portions 14 and 84 by the synchronous feeding of the tap with the drill 10 and the tap with the drill 80.

Figure 4B:
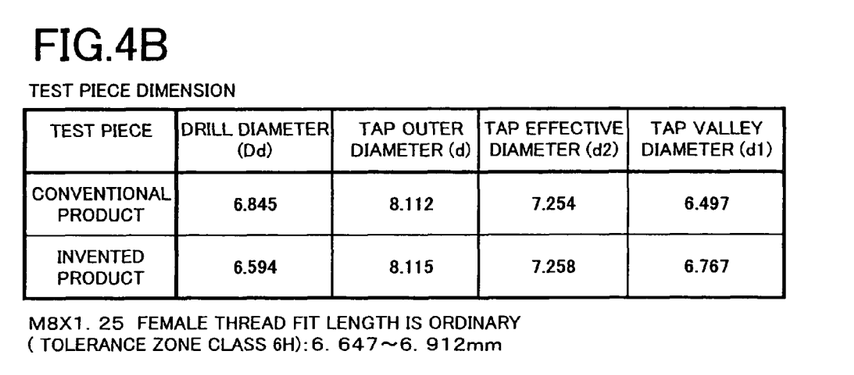

Further, the drill diameter Dd of the conventional test piece is 6.845 mm, and is previously selected within a range of the allowable dimension from $D_{1min}$ to $D_{1max}$, that is, from 6.647 to 6.912 mm. The valley diameter $d_1$ of the tap portion 84 is 6.497 mm, which is sufficiently smaller than the drill diameter Dd=6.845 mm, which defines the inner diameter $D_1$ of a female thread 92.

On the other hand, the valley diameter $d_1$ of the tap portion 14 of the invented test piece is 6.767 mm, and is previously selected within a range of the allowable dimensions $D_{1mix}$ to $D_{1max}$, that is, 6.647 to 6.912 mm. Specifically, the valley diameter $d_1$ is selected equal to or smaller than $[D_{1min} + (D_{1max}-D_{1min})/2]=6.647+0.133=6.78$ mm, which is half the tolerance. The drill diameter Dd is 6.594 mm and is sufficiently smaller than the valley diameter $d_1$=6.767 mm of the tap portion 14, which defines the inner diameter $D_1$ of the female thread 30.

Figure 4C:
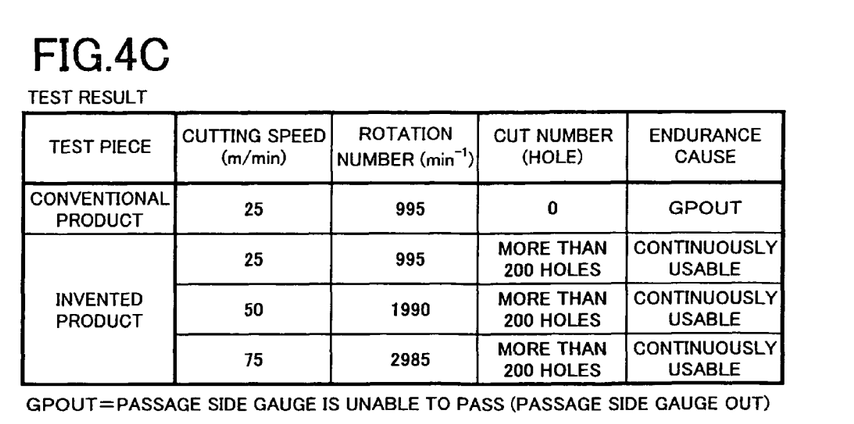

As apparent from the test result of FIG. 4C, in the conventional test piece (the tap with the drill 80), the drill 86 contacts with the female thread 92, upon reversely rotated to be pulled out from the female thread 92 after cutting the females thread 92, to damage the ridges or to create the burrs. Thus, a passage side gauge becomes defective with no hole being cut. In contrast to this, in the invented test piece (the tap with the drill 10), 200 or more holes can be cut at any cutting speed of 25, 50, and 75 (m/min). In other words, the drill 12 is prevented from contacting with the female thread 30, not damaging the ridges, when the tap with the drill 10 is reversely rotated to be pulled out. Thus, the female thread 30 can be stably cut with high precision.

Figure 5:
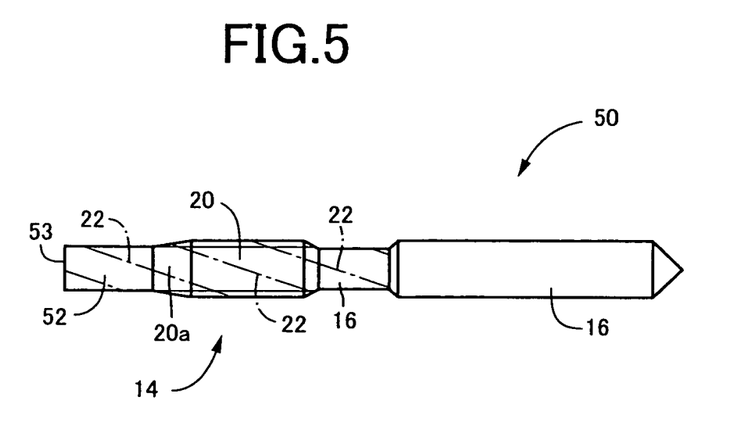
FIG. 5 is a schematic front view showing a tap with an end-mill applied with the present invention.

In the above-described embodiments, the case where the present invention is applied to the tap with the drills 10 and 40 was explained, but the present invention can also be applied to a tap with end-mill 50 shown in FIG. 5. In this tap with end-mill 50, as compared with the tap with the drill 10 of FIG. 1, an end-mill 52 is provided in place of the drill 12, and the diameter Dd of the drilling edges (bottom blade) 53 of the end-mill 52 is selected equal to the above diameter Dd of the drill 12. When the end-mill 52 is a taper end-mill, the maximum diameter of the outer peripheral edges may is selected equal to the diameter Dd of the drill 12.

Such tap with end-mill 50 is suitably employed when the female thread 30 is cut on the workpiece to be cut 32 provided previously with a rough hole such as a cast hole which is smaller than the inner diameter of the female thread 30 to be formed.

The embodiments of the present invention described in detail with reference to the drawings are exemplary embodiments. The present invention can be carried out in the modes added with various modifications and improvement based on the knowledge of the person skilled in the art.

Industrial Applicability

In the tap with prepared hole cutting tool of the present invention, the diameter Dd of the drilling edges of the prepared hole cutting tool is selected smaller than the valley diameter $d_1$ of the male thread of the tap portion, which defines the inner diameter $D_1$ of the female. Therefore, the predetermined radial gap is formed between the female thread formed by the tap portion and the prepared hole cutting tool. When the tap with prepared hole cutting tool is reversely rotated to be pulled out from the female thread after cutting the female thread, the tap released from the restriction may defectively displace in the diameter direction upon pulling-out of the male thread of the tap portion from the female thread. However, the prepared hole cutting tool hardly contacts with the female thread, so that the occurrence of the defective product resulted from such contact is suppressed. Thus, the tap with prepared hole cutting tool is suitably employed in the technical field to cut the female thread on the prepared hole continuously.

The invention claimed is:

1. A group of taps with prepared hole cutting tools, each of the taps including,
    the prepared hole cutting tool having drilling edges for cutting a prepared hole; and
    a tap portion provided with a male thread corresponding to a female thread to be formed and thread cutting edges formed along chip discharging flutes provided to divide the male thread,
        wherein the tap portion is provided for cutting the female thread by the thread cutting edges on the prepared hole formed by the prepared hole cutting tool,
        wherein the prepared hole cutting tool and the tap portion are coaxially and integrally formed,
        wherein each of the taps has a diameter Dd of the drilling edges of the prepared hole cutting tool selected smaller than a valley diameter $d_1$ of the male thread of the tap portion, and an inner diameter $D_1$ of the female thread being determined depending on the valley diameter $d_1$ of the male thread, and
        wherein, when one tap among the group of taps has a larger protruding dimension from the tap portion to a top end of the prepared hole cutting tool than another of the group of taps, the one tap has a larger difference between the diameter Dd of the drilling edges of the prepared hole cutting tool and the valley diameter $d_1$ of the male thread of the tap portion than the another tap, and the drilling edges of the prepared hole cutting tool of the one tap have the diameter Dd smaller than the e diameter Dd of the another tap.

2. The group of the taps with the prepared hole cutting tools according to claim 1, wherein the valley diameter $d_1$ of the male thread of the tap portion is selected within a range from a minimum allowable dimension $D_{1min}$ to a maximum allowable dimension $D_{1max}$ selected in advance for the inner diameter of the female thread to be formed,
    wherein the minimum allowable dimension $D_{1min}$ is an inner diameter dimension of a reference ridge shape of the female thread is constant, and
    wherein the maximum allowable dimension $D_{1max}$ changed depending on a required precision.

3. The group of the taps with the prepared hole cutting tools according to claim 2, wherein the diameter Dd of the drilling edges of the prepared hole cutting tool is selected smaller than the minimum allowable dimension $D_{1min}$.

4. The group of the taps with the prepared hole cutting tools according to claim 1, wherein the prepared hole cutting tool is a drill.

5. The group of the taps with the prepared hole cutting tools according to claim 1, wherein the prepared hole cutting tool is an end-mill.

* * * * *